(12) United States Patent
Amidon et al.

(10) Patent No.: US 8,819,149 B2
(45) Date of Patent: Aug. 26, 2014

(54) SYSTEMS AND METHODS FOR NOTIFYING A COMPUTING DEVICE OF A COMMUNICATION ADDRESSED TO A USER BASED ON AN ACTIVITY OR PRESENCE OF THE USER

(75) Inventors: Christopher M. Amidon, Apex, NC (US); Scott Curtis, Durham, NC (US); Ravi Katpelly, Cary, NC (US)

(73) Assignee: Modena Enterprises, LLC, Wilmington, DE (US)

( * ) Notice: Subject to any disclaimer, the term of this patent is extended or adjusted under 35 U.S.C. 154(b) by 49 days.

(21) Appl. No.: 13/021,899

(22) Filed: Feb. 7, 2011

(65) Prior Publication Data

US 2012/0136942 A1    May 31, 2012

Related U.S. Application Data

(60) Provisional application No. 61/309,899, filed on Mar. 3, 2010.

(51) Int. Cl.
| | | |
|---|---|---|
| *G06F 15/16* | (2006.01) | |
| *H04W 76/02* | (2009.01) | |
| *H04L 29/08* | (2006.01) | |

(52) U.S. Cl.
CPC ............. *H04W 76/02* (2013.01); *H04L 67/306* (2013.01)
USPC ....................................................... 709/206

(58) Field of Classification Search
CPC .............................. H04L 67/306; H04W 76/02
USPC ................... 455/456.3, 412.2, 466, 411, 417; 705/319; 709/206, 207, 224
See application file for complete search history.

(56) References Cited

U.S. PATENT DOCUMENTS 5,550,907 A    8/1996  Carlsen
5,565,909 A   10/1996  Thibadeau et al.
(Continued)

FOREIGN PATENT DOCUMENTS

EP       1923830 A2    5/2008
JP    2004118853 A    4/2004
(Continued)

OTHER PUBLICATIONS

Audet, F. et al., "Extended REFER," Slides from International Engineering Task Force (IETF), 59th Meeting, Feb. 29-Mar. 5, 2004, Seoul, South Korea, found at <http://www.softarmor.com/sipping/meets/ietf29/slides/>, 13 pages.

(Continued)

*Primary Examiner* — Jungwon Chang
(74) *Attorney, Agent, or Firm* — Olive Law Group, PLLC

(57) ABSTRACT

Disclosed herein are methods and systems for notifying a computing device of a communication addressed to a user based on an activity or presence of the user. According to an aspect, a method includes storing identification of a computing device associated with one or both of an activity and presence of a user. For example, the identification may be stored in a mobile device. The method may include receiving a communication addressed to the user. For example, the communication may be received at a mobile device and managed by a communication manager. In response to receiving the communication, the communication manager may apply a communication rule for notifying the computing device of the communication based on the activity and/or presence of the user.

16 Claims, 7 Drawing Sheets

(56) References Cited

U.S. PATENT DOCUMENTS

| | | | |
|---|---|---|---|
| 5,577,041 A | 11/1996 | Sharma et al. | |
| 6,011,975 A | 1/2000 | Emery et al. | |
| 6,278,704 B1 | 8/2001 | Creamer et al. | |
| 6,314,296 B1 | 11/2001 | Hamada et al. | |
| 6,366,856 B1 | 4/2002 | Johnson | |
| 6,618,593 B1* | 9/2003 | Drutman et al. | 455/456.3 |
| 6,724,872 B1 | 4/2004 | Moore et al. | |
| 6,978,003 B1 | 12/2005 | Sylvain | |
| 6,992,584 B2 | 1/2006 | Dooley et al. | |
| 7,043,362 B2 | 5/2006 | Krull et al. | |
| 7,046,994 B1 | 5/2006 | Padawer et al. | |
| 7,047,019 B1 | 5/2006 | Cox et al. | |
| 7,054,621 B2 | 5/2006 | Kennedy | |
| 7,068,768 B2 | 6/2006 | Barnes | |
| 7,085,578 B2 | 8/2006 | Barclay et al. | |
| 7,096,009 B2 | 8/2006 | Mousseau et al. | |
| 7,120,455 B1 | 10/2006 | Chen et al. | |
| 7,139,797 B1 | 11/2006 | Yoakum et al. | |
| 7,143,214 B2 | 11/2006 | Hayes et al. | |
| 7,184,523 B2 | 2/2007 | Dixit et al. | |
| 7,196,630 B2 | 3/2007 | Baker | |
| 7,212,111 B2 | 5/2007 | Tupler et al. | |
| 7,215,750 B2 | 5/2007 | Nguyen et al. | |
| 7,231,428 B2 | 6/2007 | Teague | |
| 7,248,677 B2 | 7/2007 | Randall et al. | |
| 7,269,413 B2 | 9/2007 | Kraft | |
| 7,330,721 B2 | 2/2008 | Bhatia et al. | |
| 7,346,668 B2 | 3/2008 | Willis | |
| 7,440,900 B2 | 10/2008 | Chang | |
| 7,487,190 B2 | 2/2009 | Black et al. | |
| 7,526,306 B2 | 4/2009 | Brems et al. | |
| 7,529,540 B2 | 5/2009 | Cox et al. | |
| 7,542,558 B2 | 6/2009 | Klein et al. | |
| 7,548,756 B2 | 6/2009 | Velthuis et al. | |
| 7,640,293 B2 | 12/2009 | Wilson et al. | |
| 7,796,998 B1 | 9/2010 | Zellner et al. | |
| 7,953,447 B2 | 5/2011 | Shostak | |
| 8,036,356 B1 | 10/2011 | Ghosh et al. | |
| 8,185,132 B1 | 5/2012 | Katpelly et al. | |
| 2001/0028703 A1 | 10/2001 | Katseff et al. | |
| 2002/0055088 A1 | 5/2002 | Feig | |
| 2002/0098844 A1 | 7/2002 | Friedenfelds et al. | |
| 2002/0172339 A1 | 11/2002 | Creswell et al. | |
| 2003/0050984 A1 | 3/2003 | Pickup et al. | |
| 2003/0112928 A1 | 6/2003 | Brown et al. | |
| 2003/0119495 A1 | 6/2003 | Hanninen et al. | |
| 2003/0147518 A1 | 8/2003 | Albal et al. | |
| 2003/0152206 A1 | 8/2003 | Kawaguchi et al. | |
| 2003/0182052 A1 | 9/2003 | DeLorme et al. | |
| 2003/0229717 A1 | 12/2003 | Teague | |
| 2004/0066920 A1 | 4/2004 | Vandermeijden | |
| 2004/0157562 A1 | 8/2004 | Ovaskainen et al. | |
| 2004/0186848 A1 | 9/2004 | Kobashikawa et al. | |
| 2005/0033811 A1 | 2/2005 | Bhogal et al. | |
| 2005/0202781 A1 | 9/2005 | Steelberg et al. | |
| 2005/0272448 A1 | 12/2005 | Tran et al. | |
| 2006/0031368 A1* | 2/2006 | deCone | 709/207 |
| 2006/0034441 A1 | 2/2006 | Kraft | |
| 2006/0052116 A1 | 3/2006 | Bhogal et al. | |
| 2006/0064739 A1 | 3/2006 | Guthrie et al. | |
| 2006/0128411 A1 | 6/2006 | Turcanu | |
| 2006/0153349 A1 | 7/2006 | Brun et al. | |
| 2006/0171523 A1 | 8/2006 | Greenwell | |
| 2006/0190591 A1* | 8/2006 | Bobde et al. | 709/224 |
| 2006/0199567 A1 | 9/2006 | Alston | |
| 2006/0200490 A1 | 9/2006 | Abbiss | |
| 2006/0215823 A1 | 9/2006 | Gruchala et al. | |
| 2006/0247853 A1 | 11/2006 | Jung et al. | |
| 2007/0036316 A1 | 2/2007 | Croak et al. | |
| 2007/0091878 A1 | 4/2007 | Croak et al. | |
| 2007/0117552 A1 | 5/2007 | Gobburu et al. | |
| 2007/0135110 A1 | 6/2007 | Athale et al. | |
| 2007/0197233 A1 | 8/2007 | Feng | |
| 2007/0243880 A1 | 10/2007 | Gits et al. | |
| 2007/0249327 A1 | 10/2007 | Nurmi | |
| 2007/0260725 A1 | 11/2007 | McCuller | |
| 2007/0266097 A1 | 11/2007 | Harik et al. | |
| 2007/0281689 A1 | 12/2007 | Altman et al. | |
| 2008/0125106 A1 | 5/2008 | Lee et al. | |
| 2008/0214148 A1 | 9/2008 | Ramer et al. | |
| 2008/0242265 A1* | 10/2008 | Cohen et al. | 455/411 |
| 2008/0250066 A1 | 10/2008 | Ekstrand et al. | |
| 2008/0304637 A1 | 12/2008 | Ganganna | |
| 2008/0318561 A1* | 12/2008 | Olshansky et al. | 455/417 |
| 2009/0034696 A1 | 2/2009 | Ramanathan | |
| 2009/0054091 A1* | 2/2009 | van Wijk et al. | 455/466 |
| 2009/0063154 A1 | 3/2009 | Gusikhin et al. | |
| 2009/0086947 A1 | 4/2009 | Vendrow | |
| 2009/0104895 A1 | 4/2009 | Kasturi et al. | |
| 2009/0124243 A1 | 5/2009 | Routley et al. | |
| 2009/0163181 A1* | 6/2009 | Ung et al. | 455/412.2 |
| 2009/0186629 A1 | 7/2009 | Soelberg et al. | |
| 2009/0197621 A1 | 8/2009 | Book | |
| 2009/0215486 A1 | 8/2009 | Batni et al. | |
| 2009/0216775 A1 | 8/2009 | Ratliff et al. | |
| 2009/0219921 A1 | 9/2009 | Beinroth et al. | |
| 2009/0225968 A1 | 9/2009 | Paranjape et al. | |
| 2009/0275307 A1 | 11/2009 | Kahn | |
| 2009/0311999 A1 | 12/2009 | Sarkar et al. | |
| 2009/0316951 A1 | 12/2009 | Soderstrom | |
| 2010/0130213 A1 | 5/2010 | Vendrow et al. | |
| 2010/0149306 A1 | 6/2010 | Gopal et al. | |
| 2010/0198742 A1* | 8/2010 | Chang et al. | 705/319 |
| 2010/0228560 A1 | 9/2010 | Balasaygun et al. | |
| 2010/0262661 A1* | 10/2010 | McColgan et al. | 709/206 |
| 2010/0316205 A1 | 12/2010 | Zheng et al. | |
| 2010/0317341 A1 | 12/2010 | Ferren | |
| 2011/0034156 A1 | 2/2011 | Gatti et al. | |
| 2011/0212712 A1 | 9/2011 | Abdel-Kader | |
| 2012/0134321 A1 | 5/2012 | Amidon et al. | |
| 2012/0135716 A1 | 5/2012 | Katpelly et al. | |
| 2012/0135718 A1 | 5/2012 | Amidon et al. | |
| 2012/0135744 A1 | 5/2012 | Curtis et al. | |
| 2012/0136529 A1 | 5/2012 | Curtis et al. | |

FOREIGN PATENT DOCUMENTS

| | | |
|---|---|---|
| JP | 2004205443 A | 7/2004 |
| JP | 2007079945 A | 3/2007 |
| TW | 262408 B | 9/2006 |
| WO | 01/31964 A1 | 5/2001 |
| WO | 01/58165 A2 | 8/2001 |
| WO | 02/11407 A2 | 2/2002 |
| WO | 2006/075853 A1 | 7/2006 |
| WO | 2009/022446 A1 | 2/2009 |

OTHER PUBLICATIONS

Campbell, A. T. and Choudhury, T., "Toward Societal Scale Sensing using Mobile Phones," white paper presented at the NSF Workshop on Future Directions in Networked Sensing Systems, Nov. 12-13, 2009, Arlington, Virginia, 1 page.

Campbell, A. T. et al., "CenceMe: Injecting Sensing Presence into Social Network Applications using Mobile Phones (Demo Abstract)," In Proc. of Ninth ACM International Symposium on Mobile Ad Hoc Networking and Computing (MobiHoc '08), Hong Kong, May 27-30, 2008, 2 pages.

Campbell, A. T. et al., "CenceMe: Injecting Sensing Presence into Social Network Applications using Mobile Phones (Demo Abstract)," In Proc. of Ninth Workshop on Mobile Computing Systems and Applications (HotMobile 2008), Napa Valley, California, Feb. 25-26, 2008, 1 page.

Campbell, Andrew T. et al., "Demo Abstract: Transforming the Social Networking Experience with Sensing Presence from Mobile Phones," SenSys'08, Nov. 5-7, 2008, Raleigh, North Carolina, 2 pages.

Campbell, Andrew T. et al., "People-Centric Urban Sensing," In Proc. of Second ACM/IEEE Annual International Wireless Internet Conference (WICON 2006), Boston, Massachusetts, Aug. 2-5, 2006, 14 pages.

Campbell, Andrew T. et al., "The Rise of People-Centric Sensing," IEEE internet Computing, Jul./Aug. 2008, published by the IEEE Computer Society, copyright 2008, IEEE, pp. 12-21, 10 pages.

(56) References Cited

OTHER PUBLICATIONS

"Cellity Address book 2.0," Presentation, Mobile Media Summit, Medienforum nrw, Koln, Jun. 24, 2009, cellity AG, Hamburg, Germany, 18 pages.

"City to showcase Typetalk phone system for deaf," NEWS.scotsman.com, at <http://news.scotsman.com/health/City-to-showcase--Typetalk.4755272.jp>, updated on Dec. 3, 2008, printed May 2, 2011, 2 pages.

Eisenman, S. and Campbell, A., "E-CSMA: Supporting Enhanced CSMA Performance in Experimental Sensor Networks using Per-neighbor Transmission Probability Thresholds," In Proc. of IEEE INFOCOM 2007, Anchorage, Alaska, May 6-12, 2007, 9 pages.

Eisenman, S. B. and Campbell, A. T., "Structuring Contention-based Channel Access in Wireless Sensor Networks," IPSN'06, Apr. 19-21, 2006, Nashville, Tennessee, copyright 2006, ACM, 9 pages.

Eisenman, S. B. et al., "The BikeNet Mobile Sensing System for Cyclist Experience Mapping," SenSys '07, Nov. 6-9, 2007, Sydney, Australia, copyright 2007, ACM, 15 pages.

Eisenman, Shane B. et al., "BikeNet: A Mobile Sensing System for Cyclist Experience Mapping," ACM Transactions on Sensor Networks, vol. 6, No. 1, Article 6, Dec. 2009, copyright 2009, ACM, 39 pages.

Eisenman, Shane B. et al., "MetroSense Project: People-Centric Sensing at Scale," WSW'06 at SenSys '06, Oct. 31, 2006, Boulder, Colorado, copyright 2006, ACM, 6 pages.

Eisenman, Shane B. et al., "Techniques for Improving Opportunistic Sensor Networking Performance," In Proc. of International Conference on Distributed Computing in Sensor Networks (DCOSS 2008), Santorini Island, Greece, Jun. 11-14, 2008, 20 pages.

"Ensure calls are never missed with SwyxWare Extended Call Routing," SAS.UK, originally found at <http://www.sas-uk.net/Swyx-Extended-Call-Routing.htm>, found at Internet Archive, dated May 9, 2008, printed May 2, 2011, 1 page.

Fallon, Sean, "Tame Cube Concept: A Good Excuse is Just a Roll Away," Apr. 10, 2008, at <http://gizmodo.com/378514/tame-cube-concept-a-good-excuse-is-just-a-roll-away>, printed Oct. 13, 2011, 2 pages.

Forrest, Brady, "iPhone's Location-Aware Apps," O'Reilly Radar, Jul. 14, 2008, copyright 2005-2009, O'Reilly Media, Inc., Internet publication, at <http://radar.oreilly.com/2008/07/iphone-location-aware-apps.html>, printed Sep. 15, 2009, 3 pages.

"Free Long Distance Calls via Google Maps," article published on Feb. 21, 2007, at <http://www.fivecentnickel.com/2007/02/21/free-long-distance-calls-via-google-maps>, copyright 2005-2008, PlanetB Media, LLC, printed Nov. 11, 2008, 7 pages.

"G-Park," PosiMotion website, at <http://www.posimotion.com/index.php?go=applications&option=view&entry=1>, copyright 2007-2009, PosiMotion LLC, 2 pages.

"GeoWhitePages," dated Aug. 6, 2006, at <http://babasave.wordpress.com/2006/08/06/geowhitepages>, printed Nov. 11, 2008, 3 pages.

"Gizmo5," Wikipedia, found at <http://en.wikipedia.org/wiki/Gizmo5> on Internet Archive, last modified May 31, 2008, captured Jun. 13, 2008, printed Nov. 11, 2011, 2 pages.

"Google Maps Mania: Google Maps US/Canada Phone Book Mashups," dated Jun. 9, 2006, posted by Mike Pegg, at <http://googlemapsmania.blogspot.com/2006/06/google-maps-uscanada-phone-book.html>, printed Nov. 11, 2008, 1 page.

"Google PhoneBook," at <http://snopes.com/computer/internet/google.asp>, last updated Feb. 21, 2005, copyright 1995-2008, snopes.com, printed Nov. 11, 2008, 2 pages.

"Google Stalk," at <http://shinyplasticbag.com/projects/stalk>, available on the Internet Archive as of Jan. 4, 2006, printed Nov. 11, 2008, 1 page.

"GrandCentral," Wikipedia, found at <http://en.wikipedia.org/wiki/GrandCentral> on Internet Archive, last modified Aug. 8, 2008, captured Aug. 10, 2008, printed Nov. 11, 2011, 2 pages.

"IBM WebSphere Presence Server," IBM Data Sheet, Dec. 2007, IBM Corporation, found at ftp://public.dhe.ibm.com/software/pervasive/presenceserver/Presence_6_2_DS_Final.pdf, 4 pages.

"Ifbyphone: IVR Solutions, Click to Call, Voice Broadcast, Call Routing," originally found at <http://public.ifbyphone.com/>, archived dated Jul. 2, 2008, found using the Internet Archive, copyright 2008, ifbyphone, printed Apr. 27, 2011, 4 pages.

Kaowthumrong, K. et al., "Automated Selection of the Active Device in Interactive Multi-Device Smart Spaces," in Workshop at UbiComp'02: Supporting Spontaneous Interaction in Ubiquitous Computing Settings, Goteborg, Sweden, Sep. 29-Oct. 1, 2002, 6 pages.

Koumpis, K. and Renals, S., "The Role of Prosody in a Voicemail Summarization System," In Proc. International Speech Communication Association (ISCA) Workshop on Prosody in Speech Recognition and Understanding, Red Bank, NJ, Oct. 22-24, 2001, pp. 87-92, 6 pages.

Lane, Nicholas D. et al., "A Survey of Mobile Phone Sensing," IEEE Communications Magazine, Sep. 2010, copyright 2010, IEEE, pp. 140-150, 11 pages.

Lane, Nicholas D. et al., "Ambient Beacon Localization: Using Sensed Characteristics of the Physical World to Localize Mobile Sensors," EmNets'07, Jun. 25-26, 2007, Cork, Ireland, copyright 2007, ACM, 5 pages.

Lane, Nicholas D. et al., "Cooperative Techniques Supporting Sensor-based People-centric Inferencing," In Proc. of Sixth International Conference on Pervasive Computing, Sydney, Australia, May 19-22, 2008, 18 pages.

Lane, Nicholas D. et al., "The Influence of Microprocessor Instructions on the Energy Consumption of Wireless Sensor Networks," In Proc. of Third Workshop on Embedded Networked Sensors (EmNets 2006), pp. 41-45, May 30-31, 2006, Cambridge, Massachusetts, 5 pages.

Lane, Nicholas D. et al., "Urban Sensing: Opportunistic or Participatory?," In Proc. of Ninth Workshop on Mobile Computing Systems and Applications (HotMobile 2008), Feb. 25-26, 2008, Napa Valley, California, 6 pages.

Lane, Nicholas D. et al., "Urban Sensing: Opportunistic or Participatory?," In Proc. of First Workshop Sensing on Everyday Mobile Phones in Support of Participatory Research, Nov. 6, 2007, Sydney, Australia, 1 page.

Lee, S.-B. et al., "Solicitation-based Forwarding for Sensor Networks," In Proc. of Third Annual IEEE Conf. on Sensor, Mesh, and Ad Hoc Communications and Networks (SECON 2006), Reston, Virginia, Sep. 25-28, 2006, 10 pages.

Lu, H. et al., "SoundSense: Scalable Sound Sensing for People-Centric Applications on Mobile Phones," MobiSys'09, Jun. 22-25, 2009, Krakow, Poland, copyright 2009, ACM, 14 pages.

Lu, Hong et al., "Bubble-Sensing: A New Paradigm for Binding a Sensing Task to the Physical World using Mobile Phones," In Intl. Workshop on Mobile Devices and Urban Sensing, St. Louis, Missouri, Apr. 21, 2008, 7 pages.

Messner, Richard A., "An Integrated Command Control and Communications Center for First Responders," Department of Electrical and Computer Engineering, University of New Hampshire, Durham, New Hampshire, 2005, found at <http://www.ece.unh.edu/svpal/Papers/2005%20SPIE%20Paper.pdf>, 14 pages.

"Method and System to Precisely Identify and Notify Callee's Status in Cellular Phone," at <http://priorartdatabase.com/IPCOM/000175628>, Oct. 16, 2008, 3 pages.

Milewski, Allen E. and Smith, Thomas M., "Providing Presence Cues to Telephone Users," AT&T Labs, Research, Oct. 3, 2000, at <http://web.mitedu/bentley/www/mobile/papers/presencecues.pdf>, 9 pages.

Miluzzo, E. et al., "CaliBree: A Self-calibration System for Mobile Sensor Networks," S. Nikoletseas et al. (Eds.), DCOSS 2008, LNCS 5067, copyright 2008, Springer-Verlag Berlin Heidelberg, pp. 314-331, 18 pages.

Miluzzo, E. et al., "CenceMe—Injecting Sensing Presence into Social Networking Applications," G. Kortuem et al., (Eds.), EuroSSC, 2007, LNCS 4793, pp. 1-28, copyright 2007, Springer-Verlag Berlin Heidelberg, 28 pages.

Miluzzo, E. et al., "Evaluating the iPhone as a Mobile Platform for People-Centric Sensing Applications," UrbanSense08, Nov. 4, 2008, Raleigh, North Carolina, pp. 41-45.

(56) References Cited

OTHER PUBLICATIONS

Miluzzo, E. et al., "Poster Abstract: Virtual Sensing Range," SenSys'06, Nov. 1-3, 2006, Boulder, Colorado, copyright 2006, ACM, 2 pages.

Miluzzo, E. et al., "Radio Characterization of 802.15.4 and Its Impact on the Design of Mobile Sensor Networks," R. Verdone (Ed.), EWSN 2008, LNCS 4913, pp. 171-188, copyright 2008, Springer-Verlag Berlin Heidelberg, 18 pages.

Miluzzo, E. et al., "Sensing Meets Mobile Social Networks: The Design, Implementation and Evaluation of the CenceMe Application," SenSys'08, Nov. 5-7, 2008, Raleigh, North Carolina, pp. 337-350, copyright 2008, ACM, 14 pages.

Musolesi, M. et al., "The Second Life of a Sensor: Integrating Real-world Experience in Virtual Worlds using Mobile Phones," HotEmNets'08, Jun. 2-3, 2008, Charlottesville, Virginia, copyright 2008, ACM, 5 pages.

Nakanishi et al., "iCAMS: A Mobile Communication Tool Using Location and Schedule Information," Pervasive computing, published by IEEE CS and IEEE ComSoc, Jan.-Mar. 2004, pp. 82-88, copyright 2004, IEEE, 7 pages.

"Park-n Find 2.0—iPhone App Index," at <http://www.iphoneappindex.com/2009/11/19/parkn-find-2-0>, Nov. 19, 2009, copyright 2009, iPhone App Index, 8 pages.

"Polar Bear Farm—iPhone Apps," at <http://www2.polarbearfarm.com/telegram.html>, copyright 2008, Polar Bear Farm Ltd, printed Apr. 27, 2011, 2 pages.

Scotsman.com, "City to showcase Typetalk phone system for deaf," Dec. 3, 2008, at <http://www.scotsman.com/news/city_to_showcase_typetalk_phone_system_for_deaf_1_1280979>, printed Oct. 13, 2011, 1 page.

"Slydial situations," originally found at <http://slydial.com/>, earliest archived dated Aug. 27, 2008, found using the Internet Archive, printed Apr. 27, 2011, 2 pages.

"Ultimate Android," Dec. 2009, 5 pages.

"User-Centric Implications | RebelVox Technology," User Benefits, found at <http://www.rebelvox.com/en/technology/user-benefits.php> on the Internet Archive, dated Mar. 1, 2009, copyright 2009, RebelVox, printed Nov. 11, 2011, 1 page.

Wan, C.-Y. et al., "Overload Traffic Management for Sensor Networks," ACM Transactions on Sensor Networks, vol. 3, No. 4, Article 18, Oct. 2007, copyright 2007, ACM, 38 pages.

\* cited by examiner

SYSTEMS AND METHODS FOR NOTIFYING A COMPUTING DEVICE OF A COMMUNICATION ADDRESSED TO A USER BASED ON AN ACTIVITY OR PRESENCE OF THE USER

CROSS REFERENCE TO RELATED APPLICATION

This application claims the benefit of U.S. provisional patent application No. 61/309,899, filed Mar. 3, 2010, and titled DYNAMIC UPDATES TO ADDRESS BOOK CONTACTS: THE HANDHELD AS PERSONAL BLACK BOX, the content of which is hereby incorporated herein by reference in its entirety.

TECHNICAL FIELD

The present disclosure relates to device-based communications.

BACKGROUND

Various computing devices or other electronic devices have become ubiquitous in today's society. For example, mobile devices can provide basic wireless telephone service and various other features available on desktop and laptop computers. Further, such computing devices can be Internet-enabled, BLUETOOTH®-enabled, or otherwise enabled for communications with various other computing devices. These computing devices may include highly efficient processors and display functionality for rendering rich graphical information that is available to be downloaded to the device over the Internet or wireless networks. These devices include personal information management (PIM) functions, such as address books, appointment calendars, and the like. In addition, these devices have the ability to handle multiple functions at once.

Many computing devices in the home or other environments are capable of communicating over the Internet or other communications networks. Such devices may include computers, mobile devices, televisions, Wi-Fi photo frames, audio players (e.g. an MP3 player), and the like. A communication request to such computing devices may arrive when a user is not in proximity to the original recipient device. Further, such a communication request may be in a format unsupported by the recipient device. Accordingly, for at least the aforementioned reasons, there is a need for systems and methods for aggregating computing devices and communication channels such that a user may be notified of an incoming communication regardless of a type of the communication or proximity of a user to a computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and systems for notifying a computing device of a communication addressed to a user based on an activity or presence of the user. According to an aspect, a method includes storing identification of a computing device associated with one or both of an activity and presence of a user. For example, the identification and associated activity and/or presence information may be stored in a mobile device. The method may include receiving a communication addressed to the user. For example, the communication may be received at a mobile device and managed by a communication manager having access to the identification and activity and/or presence information of the user. In response to receiving the communication, the communication manager may apply a communication rule for notifying the computing device of the communication based on the activity and/or presence of the user.

According to another aspect, a method may include receiving a notification message concerning a communication received at a computing device. The method may also include determining an instruction for the computing device for managing the communication in response to receiving the notification message. For example, a communication manager residing on a computing device may determine an instruction based on user input. The instruction may then be communicated to the computing device that originated the notification message.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
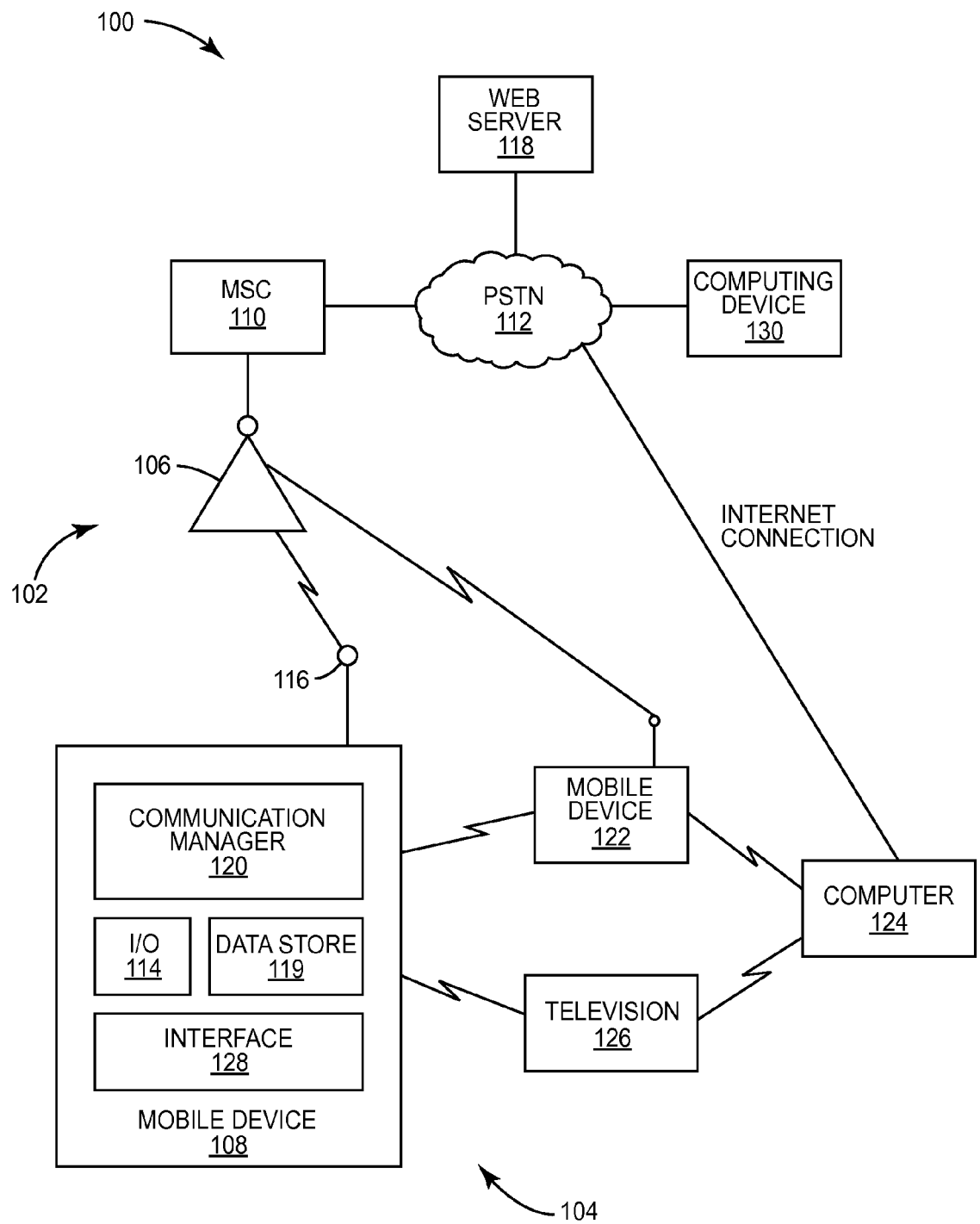
FIG. 1 is a schematic diagram of a system for applying a communication rule for notifying a computing device of a communication in accordance with embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable a computing device to: store identification of one or more computing devices associated with one or both of an activity and presence of a user; receive a communication addressed to the user; and, in response to receiving the communication, apply a communication rule for notifying the one or more computing devices of the communication based on the activity and/or presence of the user. Further, other embodiments enable a user to implement other features of the present disclosure in a computing device as will be described in further detail herein.

In accordance with embodiments of the present disclosure, computing devices may be connected together via one or more communications networks. Each computing device may be aware of the others and may also store information indicating which of the devices that a user is either interacting with and/or in close proximity to. When a communication is received by any of the computing devices, the recipient device may notify the user on any other active or nearby device. The other device may be notified via one or more notification messages. Further, for example, the recipient device may hand off or forward the communication to a specified computing device.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, a television, a wireless communication-enabled photo frame, or the like. A computing device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE® smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks, or other client applications. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, a 3G-compliant device, or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

In another exemplary operating environment, the computing devices described herein may communicate with each other in any suitable wired or wireless communications network. For example, the computing devices may include suitable I/O communications hardware, software, and/or firmware for communicating with each other via a wireless communications network such as BLUETOOTH® technology or IEEE 802.11 technology. The computing devices may also be suitably equipped for wired communications with one another via, for example, a telephone line.

Applying a Communication Rule for Notifying a Computing Device of a Communication The presently disclosed subject matter is now described in more detail. For example, FIG. 1 is a schematic diagram of a system 100 for applying a communication rule for notifying a computing device of a communication in accordance with embodiments of the present disclosure. Referring to FIG. 1, the system 100 may include a cellular network 102 and a wireless local area network (WLAN) 104. The cellular network 102 is a radio network that may be distributed over land areas often referred to as cells, each served by at least one fixed-location transceiver known as a base station, such as, for example, base station 106. Mobile devices, such as mobile device 108, may wirelessly communicate with the base station 106 for communicating with other mobile devices and for communicating with the Internet. For example, the mobile device 108 may include suitable hardware, software, and/or firmware for establishing a telephone call between the mobile device 108 and another mobile device when a call is initiated at the mobile device 108 (e.g., when a user of the mobile device 108 dials the telephone number of the other device), or when the mobile device 108 receives a call originating from the other device. Such a telephone call link can be implemented via suitable network components, such as, but not limited to, the base station 106, an MSC 110, PSTN 112, and various other network components, which are not shown herein for ease of illustration.

The mobile device 108 may include a wireless input/output (I/O) component 114 or any other suitable communication interface may be used for communicating data to other devices and for receiving communication data from other devices via a network as will be understood to those of skill in the art. The mobile device 108 may include an antenna 116 for wirelessly sending and receiving communications to the base station 106 or any other suitable communications unit.

The mobile device 108 may be any type of computing device capable of receiving communications from another device. The mobile device 108 comprises a number of functional components. This representation of the mobile device 108 is meant to be for convenience of illustration and description, and it should not be taken to limit the scope of the present disclosure as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile device 108 may include a graphics rendering engine for displaying information to the end user in the usual manner. The mobile device 108 is Internet-accessible and can interact with a web server 118 using known Internet protocols such as HTTP, HTTPS, and the like. The web server 118 is shown as a single device but this is not a requirement either; one or more programs, processes, or other code may comprise the web server 118 and be executed on one or more machines (in one or more networked locations).

The WLAN 104 is configured for linking two or more devices using a suitable wireless distribution technique, such as spread-spectrum or orthogonal frequency-division multiplexing (OFDM). The WLAN 104 may provide a connection through a suitable access point, such as a router (not shown in FIG. 1). As a result, a user of a connected device may have the mobility to move within a local coverage area while maintaining connection. Communications within the WLAN 104 may be in accordance with, for example, the IEEE 802.11 standard. The communication manager 120 is configured to operate within the WLAN 104 for communicating with another mobile device 122, a computer (e.g., a desktop or laptop computer) 124, and a television 126. Although the example described herein uses a WLAN for connecting the devices, any other suitable communications network may be used for communicatively connecting the devices.

The operation of the system can be described by the following example. As shown in FIG. 1, the mobile device 108 includes various functional components and associated data stores, such as data store 119, to facilitate the operation. The operation of the disclosed methods may be implemented using system components other than as shown in FIG. 1. The user may use an interface 128 of the mobile device 108 for interacting with the mobile device.

Figure 2:
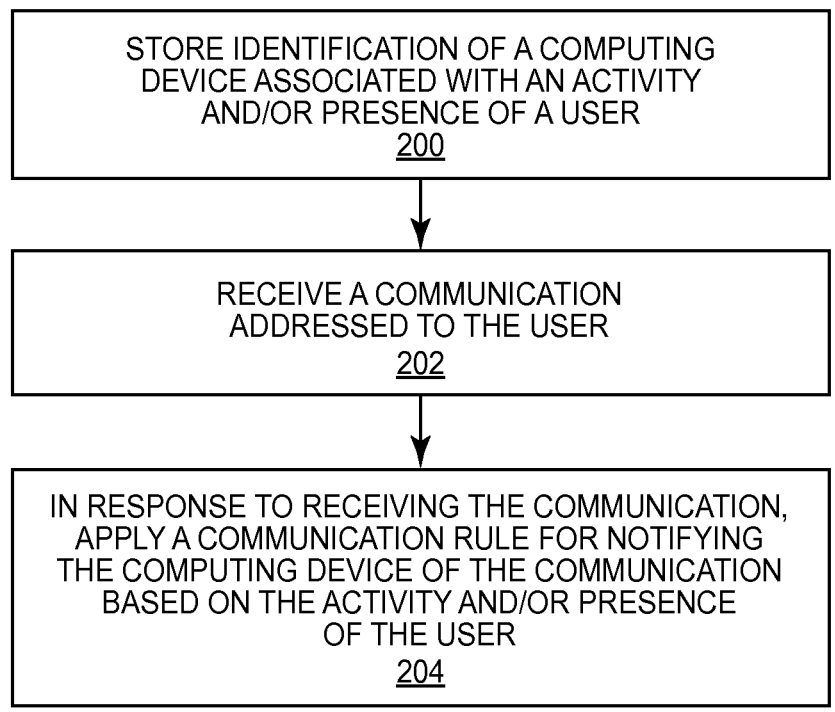
FIG. 2 is a flow chart of an exemplary method that may be implemented by a mobile device for notifying another computing device of a communication in accordance with embodiments of the present disclosure.

In this example, the mobile device 108 includes a communication manager 120 configured to apply a communication rule for notifying a computing device of a communication in accordance with embodiments of the present disclosure. FIG. 2 illustrates a flow chart of an exemplary method that may be implemented by the mobile device 108 for notifying another computing device of a communication in accordance with embodiments of the present disclosure. Although many of the examples provided herein are implemented on the mobile device 108, the examples may similarly be implemented on any suitable computing device or together with other devices or components.

Referring to FIG. 2, the method includes storing identification of one or more computing devices associated with an activity and/or presence of a user (step 200). For example, referring to FIG. 1, the data store 119 of the mobile device 108 may store identification of the mobile device 122, computer 124, television 126, and a computing device 130 communicatively connected to the PSTN 112. The identification may include identifiers for communicating with the devices. For example, the identifier may be a telephone number, an email address, a unique device identifier, and the like. Further, for example, the data store 119 may store data indicating an activity and/or presence of a user associated with a computing device identifier. The activity data may indicate, for example, that the associated device is currently in use or turned on, the associated device is currently not in use or turned off, specifics about a type of use of the device (e.g., a mode or action taken or being taken by the device), and/or measurements detected by the device (e.g., sound data, movement data, and geographic location data). Presence information may indicate that the user is currently at a device, in proximity to the device, or is not in proximity to the device. Additionally, the presence information may indicate the user's interaction with the device. For example, "active" interaction may include typing, whereas "infrequent" interaction may include changing channels and the like.

The method of FIG. 2 includes receiving a communication addressed to the user (step 202). For example, the I/O component 114 of the mobile device 108 may receive a telephone call, an email, a text message, an instant message, or the like. The communication may be directed to a user of the mobile device 108. The communication manager 120 of mobile device 108 may be suitably configured to detect receipt of the communication.

The method of FIG. 2 includes applying, in response to receiving the communication, a communication rule for notifying the computing device of the communication based on the activity and/or presence of the user (step 204). For example, referring to FIG. 1, the data store 119 of the mobile device 108 may store a communication rule including specifications for notifying another computing device of a received communication. The communication rule may specify steps to be applied in response to receiving a communication. In an example, a step may include determining whether to notify one or more computing devices of the received communication based on specified criteria, which may include, but is not limited to, an activity of a computing device, proximity of the computing device to another computing device, another user in proximity to the computing device, and/or urgency of the communication addressed to a user. In response to the communication meeting one or more criteria, the mobile device 108 may notify one or more of the mobile device 122, computer 124, television 126, and computing device 130 of the communication.

In an example, the mobile device 108 may notify another computing device of a communication in any suitable manner. For example, the mobile device 108 may automatically generate a notification message (e.g., an email, a text message, and an instant message) and may automatically communicate the notification message to the designated computing device in response to receipt of the communication meeting the criteria. The notification message may be communicated directly to the other computing device (e.g., via BLUETOOTH® communication) or sent to the other computing device via any suitable network such as, for example, the cellular network 102 or the WLAN 104.

In another example, the mobile device 108 may forward the communication to the other computing device. For example, if the received communication is an email, the email may be automatically forwarded to the other computing device in response to receipt of the communication meeting the criteria.

In accordance with embodiments of the present disclosure, a notification message or other communication to a recipient device may be suitably formatted based on one or more criteria. According to an aspect of the present disclosure, the communication manager 120 may format the notification message based on a functionality of the recipient computing device. For example, in association with identification of a computing device, the data store 119 may store information specifying a functionality of the computing device. Using the functionality information, a notification message or other communications to be directed to the computing device may be suitably formatted for use by the computing device. Such formatting may be needed because different computing devices can have different capabilities, and the notification message or other communications can be suitably formatted by the communication manager 120 or other component of the mobile device 108 prior to sending the notification message or communication. For example, the font size of text contained in an email message received at the mobile device 108 may be increased or decreased in a communication to the television 126 based on a resolution and/or size of a display screen of the television 126. In another example, a phone call received at the mobile device 108 may be forwarded to a laptop. The laptop computer may be configured to show maps, images, etc. The communication manager 120 may select an image from the local network associated with the caller, and may create a map based on the caller's current location. These images may be sent along with the phone call to the laptop computer. Alternatively, just the caller ID and location may be sent to the laptop computer, and the laptop computer may select a profile image to display and launch a map application for displaying the location.

In another example of formatting a notification message or other communication, the communication manager 120 may format the notification message based on an activity of a user of the computing device. For example, in association with identification of the computing device, the data store 119 may store information specifying an activity of the user of the computing device. The activity information may indicate, for example, user inputs to the computing devices with which an activity of the user may be inferred. For example, at the television 126 shown in FIG. 1, inputs may include volume and channel changes. In this example, the television 126 may communicate this information to the mobile device 108 and, in response to receipt of the information, the information may be stored in the data store 119. The communication manager 120 may access the information and may determine that the user is watching the television 126 based on the user input information. In this way, the communication manager 120 may determine an activity of the user at the television 126. Further, for example, the communication manager 120 may determine that the user is in proximity to the television 126 based on the information. In this way, the communication manager 120 may determine a presence of the user at the television 126. In addition, the time of receipt of the activity information and any geographic location information associated with the television 126 may define whether the user is currently watching the television or has recently been watching the television. In response to determining that the user is watching the television 126 and/or is in proximity to the television 126, the communication manager 120 may format a notification message or other communication for presentation on the television 126. For example, in order to reduce interference with viewing of the television 126, the text contained in an email message received at the mobile device 108 may be reduced or condensed in a communication to the television 126 based on the information indicating that the user is watching the television 126 or is in proximity to the television 126. In this way, the user can be notified of the message without interference with his or her viewing of the television 126. In another example, the user may be actively utilizing applications on his or her laptop computer when a new communication arrives. The communication manager 120 may be aware of the high level of activity on the laptop and in response to determining there is a high level of activity, may minimize the interruption of the communication by simply forwarding the caller's name to the device. The laptop may display an alert, such as the text "incoming call," on the laptop computer's toolbar. Alternatively, if the user is present at the laptop and the activity level on the computer is low, the full details of the call (photo, location, etc.) may be displayed or otherwise presented to the user via a popup display window, for example.

In another example of formatting a notification message or other communication, information may be provided to the mobile device 108 for indicating the user's activity on another device and providing a notification message based on the activity. For example, the television 126 may provide information indicating that the television 126 is presenting programming and that the presentation is near the beginning or end of the programming. At the beginning, such as with a game or movie, the content may not be as important to the user as the content presented at the end. In response to determining whether the presentation is near the beginning or end, the mobile device 108 may provide differing notification messages to the television 126. For example, if the presentation is at the beginning, a voice or video notification may be provided. If the presentation is at the end, a text-based notification may be provided.

In another example of formatting a notification message or other communication, the communication manager 120 may format the notification message based on a characteristic of the received communication. For example, the notification message may be modified depending on a size and/or type of the received communication. For example, in response to receiving an email, the communication manager 120 may generate a notification message including identification of the originator of the email and the subject of the email. The body of the email may not be included in the notification message. In another example, in response to receiving a text message, identification of the originator of the text message and the entirety of the text in the message may be included in the notification message. In another example, in response to receiving a video phone call, the communication manager 120 may include a snapshot from the video (image) with the notification message. Alternatively, the communication manager 120 may forward the video stream along with the notification.

In another example of formatting a notification message or other communication, the communication manager 120 may format the notification message based on a content of the received communication. For example, an incoming communication may be marked as urgent or include text or other indicators to indicate that the communication is urgent or relates to an emergency situation. The communication manager 120 may analyze the communication for determining whether the communication is marked as urgent or includes any other indicator indicating that the communicate is urgent or relates to an emergency situation. In response to determining that the communication is marked as urgent or relates to an emergency situation, the communication manager 120 generate a notification message indicating that an urgent or emergency communication has been received. The generated notification message may then be communicated to the television 126, for example. Further, in response to determining the communication is marked as urgent or relates to an emergency situation, the notification message may be communicated to all computing devices associated with the user. In this way, an effort to reach the user may be attempted on all computing devices known to be associated with the user. In another example, when the communication includes an attachment, the communication manager 120 may download and format the attachment based on the receiving device. If the receiving device is a laptop computer, the notification message may include the actual document, whereas if the receiving device is a television, the attachment may be converted to an image format supported by the television.

In another example of formatting a notification message or other communication, the communication manager 120 may format the notification message based on a specified user preference. For example, the user may enter a communication rule specifying one or more actions to be taken in response to receipt of a telephone call on his or her phone while the user is watching an identified television. In this example, the communication may specify that, in response to receipt of such a telephone call, the phone may automatically forward the call to a SKYPE™ application residing on the identified television. The television may be identified in the communication rule. Identification of the television and the communication rule may be stored in the data store 119. In another example, the communication rule may specify automatically implementing any user-defined action, such as forwarding a communication based on previous interactions for similar scenarios. In another example, the communication may be formatted according to user preferences related to the current content being consumed. For example, if the user is watching a sporting event, the communication can include all text, audio, video, etc. However, if the user is watching a movie, the communication can only include text. The communication may also be altered based on the user's preferences regarding other contextual factors, such as: who else is in the room, time of day, etc.

In another example of formatting a notification message or other communication, the communication manager 120 may format the notification message based on another user in proximity to the computing device. For example, a user may determine that all possible information is included with the communication if family members are present. However, if anyone other than family members is present, the notification message is formatted to only include the sender's name and/or number. The presence of other users in proximity can be determined by any number of techniques. For example, the system may include video cameras for capturing images of the device user and/or other nearby people. In this example, the captured images can be analyzed for identifying the device user as well as others. In another example of detecting the presence of the device user and others, the system may utilize BLUETOOTH® technology, or other wireless technologies to communicate with a device in possession of other users in order to determine the presence and identity of the user. In another example technique, the system may simply require users to "log-in" to confirm their presence. Any of these techniques, or other techniques known in the art to determine the presence and identity of users may be utilized by the communication manager 120.

According to embodiments of the present disclosure, a user may specify a communication rule to be applied based on information contained in or associated with a received communication. For example, the mobile device 108 may receive information concerning the activity of a computing device associated with a user, proximity of the computing device to another computing device, functionality of the computing device, user preferences for receiving communications, another user in proximity to the computing device, and/or urgency of the communication addressed to the user in accordance with embodiments of the present disclosure. The communication rule may be stored in the data store 119 and may specify one or more actions to initiate when a received communication meets one or more requirements associated with the received information. The communication manager 120 may apply the specified action(s) of the communication in response to receiving a communication meeting the requirements.

According to embodiments of the present disclosure, a user of the mobile device 108 may use an application (often referred to as an "app") residing on the mobile device 108 to interact with the communication manager 120 via the interface 128 for specifying communication rules. The application may reside on the mobile device 108 and may be a part of the communication manager 120. The user may, for example, input commands into the interface 128 for selecting an icon to initialize the application. The application may have been downloaded from a web server, such as a web server 118, and installed on the mobile device 108 in any suitable manner. The application may be downloaded to another machine (such as the mobile phone user's PC) and then transferred to the mobile device over a medium such as a BLUETOOTH® connection. In an example, the application can enable the mobile device 108 with one or more of the features according to embodiments of the present disclosure.

In accordance with embodiments of the present disclosure, a communication rule may specify different instructions or actions in a notification message that may be implemented by a recipient of the message. For example, a notification message may specify one or more actions that may be selected by a user at the recipient device. Various actions may be made available to the user based on, for example, but not limited to, a communication channel on which the communication was received. For example, the mobile device 108 may receive a communication via a telephone call, email, text message, or the like. If the communication is a telephone call, the communication rule may specify that the telephone call may either be placed in either a "Hold" mode, an "Answer" mode, or an "Ignore" mode. In the "Hold" mode, the mobile device 108 may answer the telephone call, present a voice message to the caller to indicate that the user will answer the call soon, and stay connected in the call until the user arrives to take the call. In this way, the mobile device 108 holds the communication for answering by the user. In the "Answer" mode, the mobile device 108 may forward the call to the other device or another device specified by the communication rule or specified by the user in a communication sent in response to receipt of the notification message. In the "Ignore" mode, the mobile device 108 may allow the call to continue ringing and may allow the call to be handled by a voicemail application or service. In this way, the mobile device 108 may ignore the call. The notification message may indicate each of the modes. In response to receipt of the notification message including indications of the available modes, the recipient device may present to the user an indicator of the modes and may provide an interface for the user to select one of the modes. The user may select one of the modes, and in response to selection of one of the modes, a response to the notification may be sent to the mobile device 108. The communication manager 120 may implement the selected mode in response to receipt of the response message. In this way, the mobile device 108 applies the instruction provided by the user at the other device.

In another example of a notification message specifying actions that may be selected by a user at a recipient device, the mobile device 108 may receive a text message directed to the user. A communication rule may specify that the text message may either be placed in either an "Ignore" mode, a "Respond" mode, or a "Forward" mode. In the "Ignore" mode, the mobile device 108 may ignore the text message. In the "Respond" mode, the mobile device 108 may respond to the text message with another text message containing one of a list of responses selected by the user, or the mobile device 108 may respond to the text message with another text message containing text entered by the user. In this way, the user may use another device to input a message that can be used by the mobile device 108 for responding to the text message. In the "Forward" mode, the mobile device 108 may forward the text message to another device selected by the user. The notification message may indicate each of the modes. In response to receipt of the notification message including indications of the available modes, the mobile device 108 may present to the user an indicator of the modes and may provide an interface for the user to select one of the modes. The user may select one of the modes, and in response to selection of one of the modes, a response to the notification may be sent to the mobile device 108. The communication manager 120 may implement the selected mode in response to receipt of the response message. In this way, the mobile device 108 applies the instruction provided by the user at the other device.

In many of the examples disclosed herein, a computing device (e.g., mobile device 108) is described as communicating a single notification message for notifying another computing device of receipt of a communication. However, the presently disclosed subject matter should not be considered so limiting. The computing device may send multiple notification messages to one or more other computing devices for notifying a user of a received communication. For example, referring to FIG. 1, the mobile device 108 may, in response to receiving a communication, generate multiple notification messages for notifying a user of the communication. The notification messages may be sent to one, some, or all of the mobile device 122, computer 124, television 126, and computing device 130. One or more notification messages may be sent to a computing device even in response to determining that the user is not active on the device or present at the device.

In accordance with embodiments of the present disclosure, a computing device may manage an incoming communication based on historical interactions between the user, devices, and calls. For example, a device may track communications and store interactions with communications. A device may store, for example, identification of a communicating device, a utilized communication channel, a caller ID, metadata for content being presented, current user activity, a recipient's response, and the like. This information may be shared among the devices. With the historical information available, the communication manager and any of the computing devices may attempt to automate user actions according to patterns identified in the history. For example, a communication device may automatically answer a call if, based on past calls from the current caller, the user typically answers the call. In another example, it may be assumed or determined based on historical interactions that a user typically ignores text messages when watching a movie but responds to text messages when watching sporting events. As such, the computing device may auto-hide, or auto-ignore incoming text messages when the user is watching a movie and may automatically initiate display of a response window when the user is watching a sports event.

A computing device may store information regarding an active status of other computing devices associated with a user. For example, referring to FIG. 1, the data store 119 of the mobile device 108 may store the active status information of the mobile device 122, computer 124, television 126, and computing device 130. The active status information may indicate whether the user is actively using a respective device. The communication manager 120 may access the active status information in response to receiving a communication to the user. In response to determining that the user is active on one or more of the devices, the communication manager 120 may generate one or more notification messages to the active device(s) and may communicate the notification message(s) to the active device(s) in accordance with embodiments of the present disclosure.

Computing devices may exchange active status information in any suitable manner. For example, a computing device may determine that a user is actively using the device. In this example, in response to detecting that the device is being actively used, the device may notify other devices of its active status. In another example, a computing device may communicate a request for active status information from other computing devices. The active status information may be stored by the computing device for subsequent use in managing incoming communications in accordance with embodiments of the present disclosure.

Figure 3:
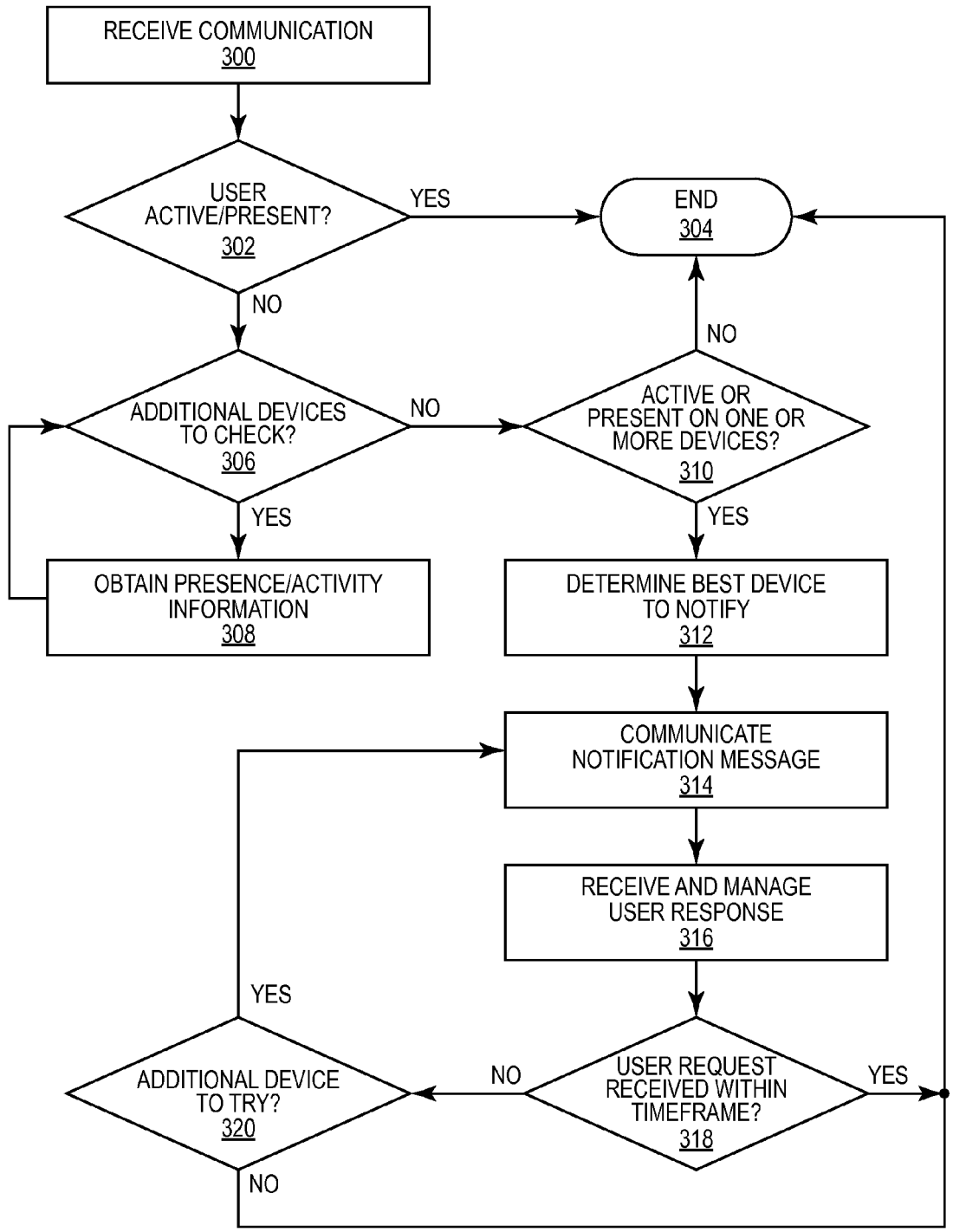
FIG. 3 is a flow chart of another exemplary method that may be implemented by a mobile device for notifying another computing device of a communication in accordance with embodiments of the present disclosure.

FIG. 3 illustrates a flow chart of another exemplary method that may be implemented by the mobile device 108 for notifying another computing device of a communication in accordance with embodiments of the present disclosure. Although many of the examples provided herein are implemented on the mobile device 108, the examples may similarly be implemented on any suitable computing device or together with other devices or components. Referring to FIG. 3, the method includes receiving a communication (step 300). The communication may be, for example, but not limited to, a telephone call, an instant message, a text message, and the like. The communication may be directed to a particular user. The communication manager 120 may recognize a user to whom the communication is directed based on an addressee in an email, for example. The data store 119 may store a list (e.g., a contact list) that associates users with address information and telephone number(s) for identifying a user to whom a received communication is directed.

The method of FIG. 3 includes determining whether a user is active or present on the mobile device (step 302). For example, the communication manager 120 may determine whether the mobile device 108 is currently in use by the user or has recently been used in response to receipt of a communication directed to the user. In another example, the communication manager 120 may determine whether the user is present (e.g., determining whether the user is logged onto the device). In response to determining that the user is active or present on the mobile device 108, the method may end (step 304). This is because the user can be assumed to be near to the device and able to manage the received communication.

In response to determining that the user is not active on the mobile device 108 and not present at step 302, the mobile device determines whether to check additional devices (step 306). For example, the communication manager 120 may implement a process for determining whether other devices are associated with the user. In this example, the communication manager 120 may check the data store 119 for determining whether other devices are associated with the user. For example, the data store 119 may contain information indicating that the mobile device 122, computer 124, television 126, and a computing device 130 are associated with the user, and information indicating whether the user is active or present at each device. The presence and activity information for each device may be obtained (step 308) by the communication manager 120. When there are no additional devices to check, the process proceeds to step 310.

At step 310, the method of FIG. 3 includes determining whether a user is active or present on one or more computing devices. In response to determining that a user is not active or not present on another computing device, the method may end (step 304).

In response to determining that a user is active or present on one or more other computing devices, the method determines a best device to notify (step 312). For example, the communication manager 120 may apply criteria for determining a best device to notify among the computing devices on which the user is active or present. The communication manager 120 may utilize a number of parameters and/or criteria in order to determine the best device to notify. For example, the communication manager may have default routing parameters where each communication channel type is mapped to a specific device. Additionally, alternate devices may be assigned. For example, for incoming phone calls, the preferred device may be a mobile phone and alternate devices may include a laptop followed by a television. Without these default mappings, the communication manager 120 may determine these defaults automatically. This may be accomplished by tracking previous communications and the devices utilized to answer them. Other parameters/criteria that may be utilized are the capabilities of the devices. As described previously, the communication manager 120 may be aware of the capabilities of the recipient devices. The communication manager 120 may route the communication to the device that has the capabilities to optimally display the notification and/or communication. Other factors that may be utilized include, for example, but are not limited to: who is calling, presence/activity of the user on a device, availability of the device, and the like. For example, when the user's wife calls, the user always answers immediately via a SKYPE™ application. As such, the communication manager 120 will select a device that has SKYPE™ capability. In another example, the user is "present" on both the television and his laptop computer. The user is watching a movie on the television, thus the television is defined to be "busy," and the communication is sent to the laptop computer. In summary, the communication manager 120 can utilize information on hand, such as predefined or generated parameters in addition to the current communication in order to determine the best device. The communication manager 120, for example, may generate a notification message and communicate the notification message to the best device to notify in accordance with embodiments of the present disclosure (step 314).

The method of FIG. 3 includes receiving and managing user response to the notification message (step 316). For example, one of the devices receiving a notification message may respond with a communication including a user response (e.g., instructions for applying a mode in accordance with embodiments of the present disclosure). The mobile device 108 may receive the user response, and the communication manager 120 may apply a communication rule in accordance with embodiments the present disclosure.

The method of FIG. 3 includes whether the user response is received within a predetermined timeframe (step 318). The predetermined timeframe may be stored, for example, in the data store 119. In response to determining that the user response has been received within the predetermined timeframe, the method may end (step 304).

In response to determining that the user response was not received within the predetermined timeframe at step 318, the communication manager 120 may determine whether there are additional computing devices to try for notifying the user of the received communication (step 320). For example, the communication manager 120 may access the data store 119 for determining whether additional devices are associated with the user. In response to determining that there are additional computing devices to try, communication messages may be sent to the other computing devices (step 314). In response to determining that there are no additional computing devices to try, the method may end (step 304).

A notification message may contain various information and/or data for notifying a user of a communication. This information and/or data may be presented to a user on a recipient device, and may contain text, images, video, and the like. The text may include, for example, but not be limited to, a caller ID, a name of the originator of the communication, geographic location information of the originator, device information, contextual information, urgency information, a message contained in the communication, and the like. The image may be an image contained in the communication or an image of the originator of the communication. The video may be, for example, a live feed from a caller, video caller ID, and the like.

Figure 4:
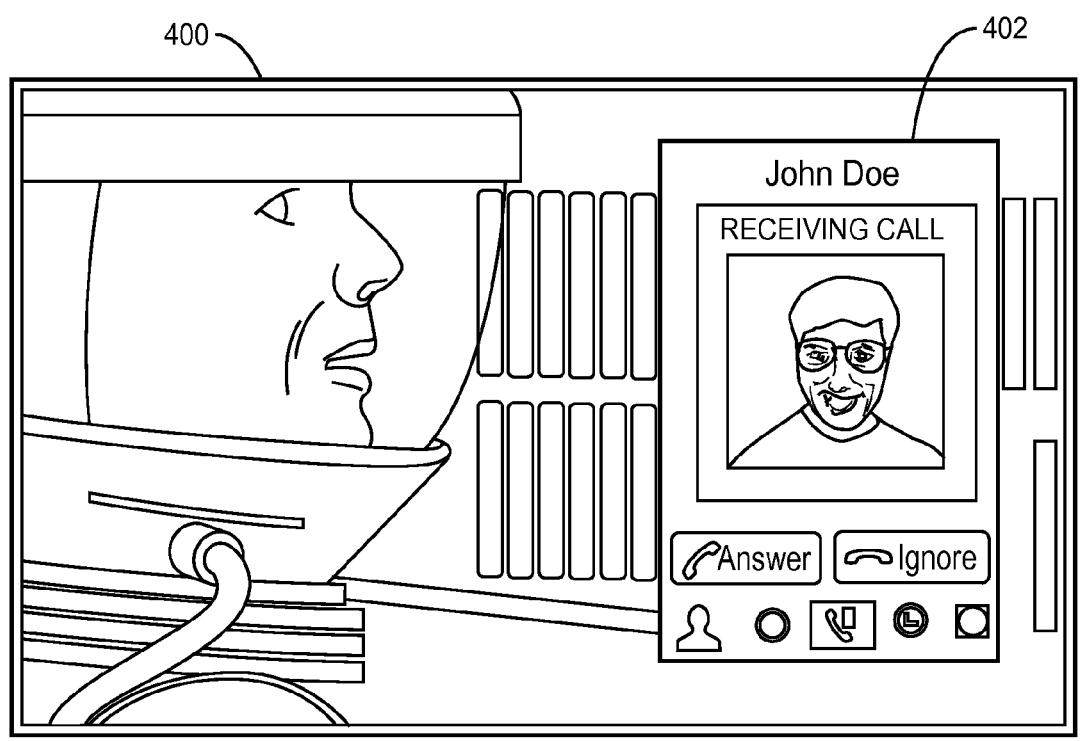
FIG. 4 is an exemplary display of a television presenting notification of a received communication at another device.

In an example, FIG. 4 illustrates an exemplary display 400 of a television presenting notification of a received communication at another device. Although a display is used in this example, this example may be similarly implemented on any other computing device including a display. In this example, a mobile device has received a telephone call and communicated a notification to the television in accordance with embodiments of the present disclosure. Referring to FIG. 4, a portion 402 of the display 400 displays an image associated with the notification message. In this example, the displayed image is identical or nearly identical to the image displayed when the communication is received on the mobile device.

The mobile device sent a notification message containing this image, and the television displays the image in response to receiving the notification message. The image displayed in portion 402 includes a text indicating the callee, the callee's image, and possible responses to the call. A user of the television, in response to viewing the displayed notification, may select or otherwise enter a response to the notification in accordance with embodiments of the present disclosure.

Communicating an Instruction to a Computing Device for Managing a Communication

In accordance with embodiments of the present disclosure, a computing device is enabled to: receive a notification message concerning a communication received at a computing device; determine, in response to receiving the notification message, an instruction for the computing device for managing the communication; and communicate the instruction to the computing device. The communication may provide notice of receipt of another communication at another computing device. Further, other embodiments enable a user to implement other features of the present disclosure in a computing device as will be described in further detail herein.

Figure 5:
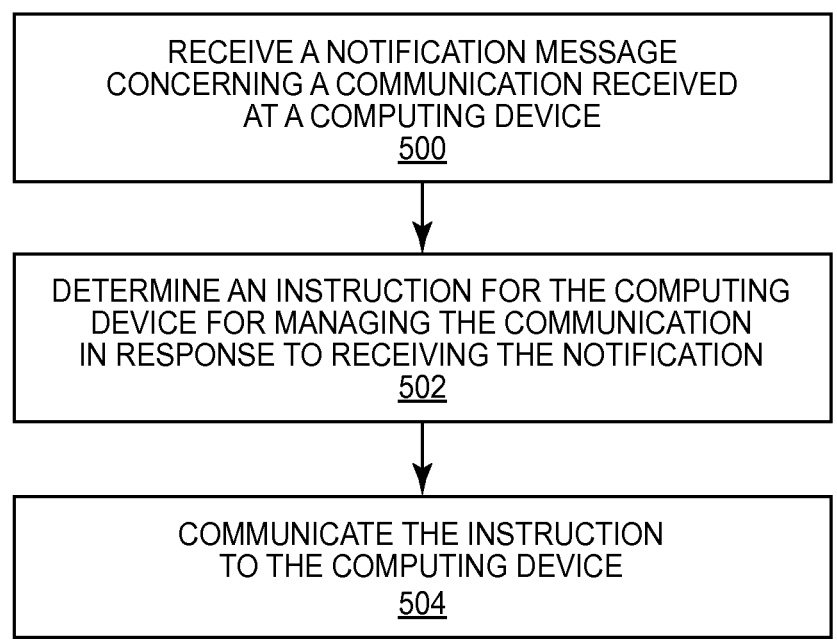
FIG. 5 is a flow chart of an exemplary method for communicating an instruction to a computing device that originated a notification message concerning a communication received at the computing device in accordance with embodiments of the present disclosure.

FIG. 5 illustrates a flow chart of an exemplary method for communicating an instruction to a computing device that originated a notification message concerning a communication received at the computing device in accordance with embodiments of the present disclosure. Although many of the examples provided herein are implemented on the mobile device 108 shown in FIG. 1, the examples may similarly be implemented on any suitable computing device or together with other devices or components. For example, these exemplary methods may be implemented on the mobile device 122, computer 124, television 126, or computing device 130.

Referring to FIG. 5, the method includes receiving a notification message concerning a communication received at a computing device (step 500). For example, referring to the FIG. 1, the mobile device 122, computer 124, television 126, or computing device 130 may receive a communication and may communicate a notification message concerning the communication to the mobile device 108 in accordance with embodiments of the present disclosure. The I/O component 114 may receive the notification message via the cellular network 102 or the WLAN 104. The notification message may indicate receipt of the communication at the computing device (e.g., the mobile device 122, computer 124, television 126, or computing device 130) originating the notification message. Further, the notification message may indicate the type of communication received at the computing device. The notification message may also include content (e.g., text, video, an image, and the like) included in the communication received at the computing device (e.g., the mobile device 122, computer 124, television 126, or computing device 130).

The method of FIG. 5 includes determining an instruction for the computing device for managing the communication in response to receiving the notification message (step 502). For example, the notification message may specify various user-selectable modes for managing the communication in accordance with embodiments of the present disclosure. Exemplary modes include: the "Hold" mode for instructing the computing device to hold the communication; the "Forward" mode for instructing the computing device to forward the communication to a specified device; and the "Ignore" mode for instructing the computing device to ignore the communication. Other examples of instructions for computing devices and particularly instruction modes are described herein.

The method of FIG. 5 includes communicating the instruction to the computing device (step 504). For example, the communication manager 120 of the mobile device 108 may generate a message containing the instruction and may send the instruction message to the originating device of the notification message. The instruction may be applied by the recipient device in response to receipt of the instruction message.

Figure 6:
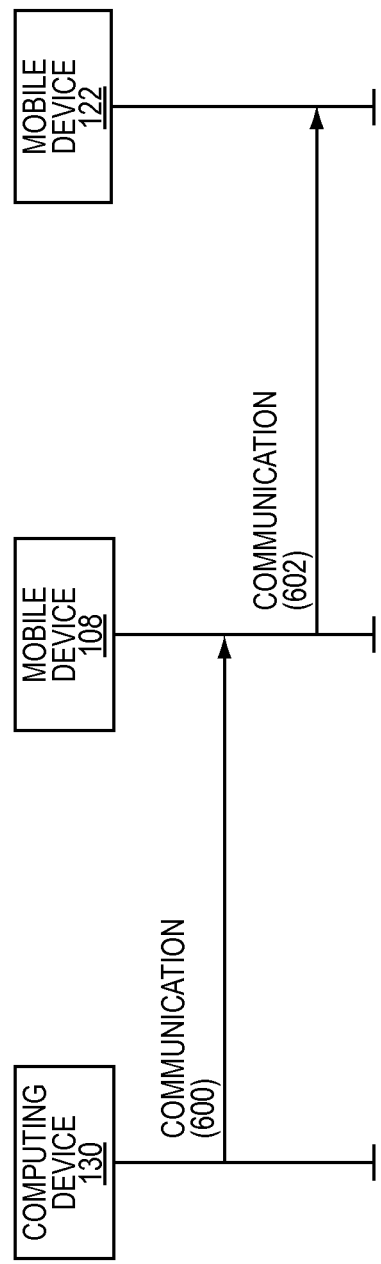
FIG. 6 illustrates a message flow diagram of an exemplary operation of the system of FIG. 1 according to embodiments of the present disclosure.

FIG. 6 illustrates a message flow diagram of an exemplary operation of the system of FIG. 1 according to embodiments of the present disclosure. Referring to FIG. 6, the computing device 130 may initiate communication to the mobile device 108 (step 600). A person to whom the communication was directed may not be available at the mobile device 108. In accordance with embodiments of the present disclosure, the mobile device 108 may be aware that the person is not available at the mobile device 108. Further, the mobile device 108 may store data indicating an activity and/or presence of the person associated with the communication from the mobile device 130. For example, the communication may be an email including an email address of the person. The activity data may indicate that the mobile device 122 is associated with the person. In addition, presence information stored at the mobile device 108 may indicate that the mobile device 122 is active and/or that the user is currently at or in proximity to the mobile device 122. In accordance with embodiments of the present disclosure, the mobile device 108 may communicate a message to the mobile device 122 for notifying the mobile device 122 of the communication from the computing device 130 (step 602). As a result, even though the communication was received at the mobile device 108 and the person was not available, the mobile device 108 may provide notification of the communication to the mobile device 122.

Figure 7:
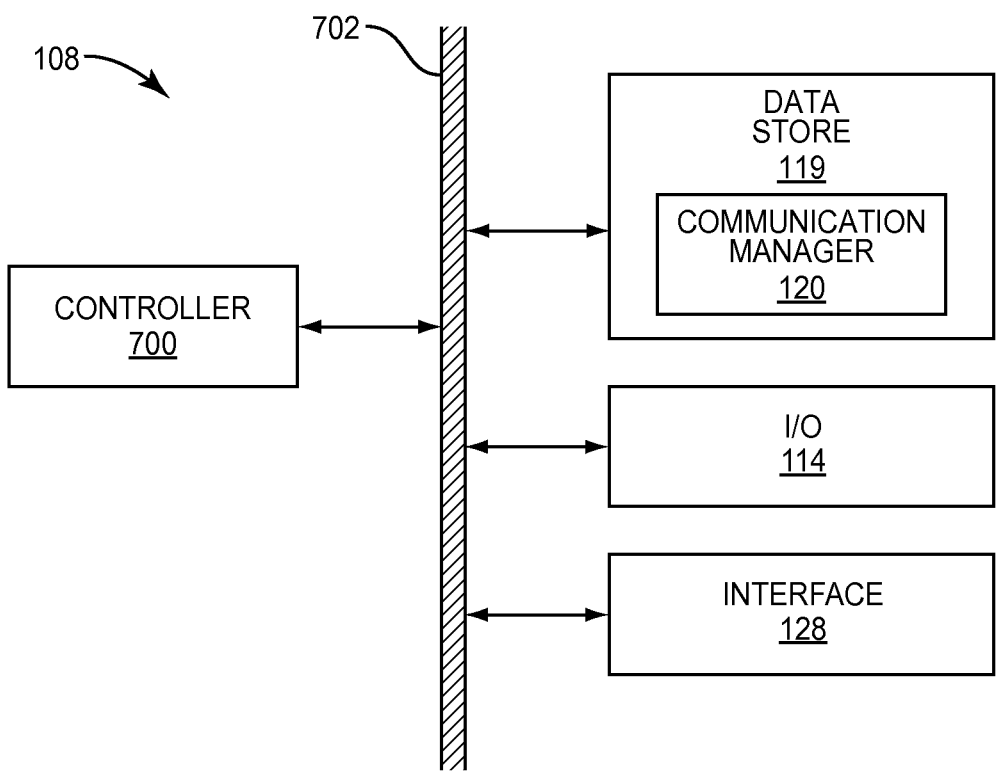
FIG. 7 is a block diagram of the mobile device shown in FIG. 1 according to embdiments of the present disclosure.

FIG. 7 is a block diagram of the mobile device 108 shown in FIG. 1 according to embodiments of the present disclosure. Referring to FIG. 7, the mobile device 108 may include a controller 700 connected to the data store 119, the I/O component 114, and the interface 128 by a bus 702 or similar mechanism. The controller 700 may be a microprocessor, digital ASIC, FPGA, or the like. In this example, the controller 700 is a microprocessor, and the communication manager 120 is implemented in software and may be stored in the data store 119 for execution by the controller 700. The I/O component 114 may be a local wireless interface such as a wireless interface operating according to one of the suite of IEEE 802.11 standards, a mobile communications interface such as a cellular telecommunications interface, or the like. The interface 128 may include, for example, a touchscreen, a display, one or more user input components (e.g., a keypad), a speaker, or the like, or any combination thereof.

The various techniques described herein may be implemented with hardware or software or, where appropriate, with a combination of both. For example, the mobile device 108 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   storing identification of each of a plurality of computing devices associated with a user;
   storing information specifying a functionality of each of the plurality of computing devices;
   receiving data associated with at least one of the plurality of computing devices, the data comprising at least one of an activity and presence of the user at the at least one computing device;
   receiving a communication addressed to the user; and
   in response to receiving the communication:
      applying a communication rule to determine, based on the at least one of the activity and presence of the user, at least one of the plurality of computing devices to send a notification message about the communication;
      formatting the notification message based on the stored information specifying the functionality of the at least one determined computing device; and
      communicating the formatted notification message to the at least one determined computing device.

2. The method of claim 1,
   wherein the method comprises storing identification of each of the plurality of computing devices, and
   wherein applying a communication rule comprises
      determining to notify the at least one computing device from among the plurality of computing devices based on at least one of activity of the computing device associated with the user, proximity of the computing device to another computing device, functionality of the computing device, user preferences for receiving communications, another user in proximity to the computing device, urgency of the communication addressed to the user, and presence of the user or others.

3. The method of claim 1, wherein receiving a communication comprises receiving at least one of a telephone call, an email, a text message, and an instant message.

4. The method of claim 1, forwarding the communication to the at least one determined computing device in response to receiving the communication.

5. The method of claim 1, wherein applying a communication rule comprises automatically forwarding the communication to the at least one determined computing device.

6. The method of claim 1, wherein formatting the notification message comprises formatting the notification message based on the activity of the user, a characteristic of the communication, a content of the received communication, a preference of the user, and another user in proximity to the at least one determined computing device.

7. The method of claim 1 comprising receiving identification of the at least one determined computing device and the at least one of the activity and presence of the user.

8. The method of claim 7, wherein receiving identification of the at least one determined computing device and the at least one of the activity and presence of the user comprises receiving, at a first computing device, at least one communication that contains the identification and that has been communicated to another computing device.

9. The method of claim 1, comprising receiving information concerning activity of each of the plurality of computing devices associated with the user, proximity of at least one of the plurality of computing devices to another one of the plurality of computing devices, preferences of the user for receiving communications, another user in proximity to at least one of the plurality of computing devices, urgency of the received communication addressed to the user.

10. The method of claim 9, wherein applying a communication rule comprises applying the communication rule based on the received information.

11. The method of claim 1 comprising receiving an instruction from one of the plurality of computing devices for managing the communication, and
    wherein the method comprises applying the instruction to the received communication in response to receiving the instruction.

12. The method of claim 11, wherein the instruction specifies that the received communication is to be held for the user, and
    wherein applying the instruction comprises holding the communication for answering by the user.

13. The method of claim 11, wherein the instruction specifies that the received communication is to be ignored, and
    wherein applying the instruction comprises ignoring the communication.

14. The method of claim 11, wherein the instruction specifies that the received communication is to be forwarded, and
    wherein applying the instruction comprises forwarding the communication to one of the at least one determined computing device or another computing device of the plurality of computing devices specified in the instruction.

15. A system comprising:
    a data store configured to:
       store identification of each of a plurality of computing devices associated with a user; and
       store information specifying a functionality of each of the plurality of computing devices;
    a communication manager comprising at least a processor and memory configured to:
       receive data associated with at least one of the plurality of computing devices, the data comprising at least one of an activity and presence of a user at the at least one computing device;
       receive a communication addressed to the user;

apply, in response to receiving the communication, a communication rule to determine, based on the at least one of the activity of the user, at least one of the plurality of computing devices to send a notification message about the communication;

format, in response to the determination, the notification message based on the stored information specifying the functionality of the at least one determined computing device; and communicate, in response to receiving the communication, the formatted notification message to the at least one determined computing device.

16. A non-transitory machine-readable storage medium having stored thereon computer executable instructions for performing the following steps:

storing identification of each of a plurality of computing devices associated with a user;

storing information specifying a functionality of each of the plurality of computing devices;

receiving data associated with at least one of the plurality of computing devices, the data comprising at least one of an activity and presence of the user at the at least one computing device;

receiving a communication addressed to the user; and in response to receiving the communication:

applying a communication rule to determine, based on the at least one of the activity and presence of the user, at least one of the plurality of computing devices to send a notification message about the communication;

formatting the notification message based on the stored information specifying the functionality of the at least one determined computing device; and communicating the formatted notification message to the at least one determined computing device.

* * * * *